UNITED STATES PATENT OFFICE.

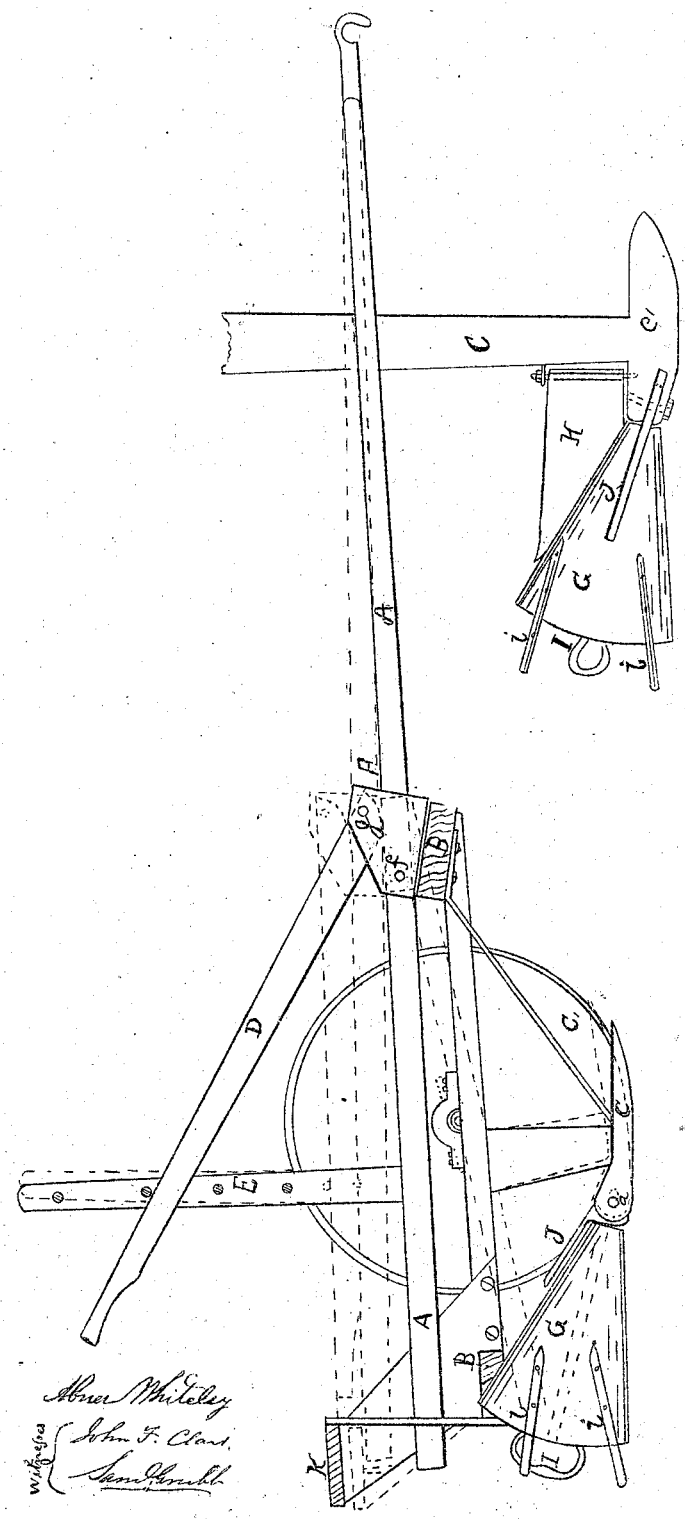

ABNER WHITELEY, OF SPRINGFIELD, OHIO.

IMPROVEMENT IN TRACK-CLEARERS TO GRASS-HARVESTERS.

Specification forming part of Letters Patent No. 11,579, dated August 22, 1854.

*To all whom it may concern:*

Be it known that I, ABNER WHITELEY, of Springfield, in the county of Clarke and State of Ohio, have invented a new and useful Improvement in Mowing and Reaping Machines; and I do hereby declare that the following is a full, clear, and exact description of the same, reference being had to the accompanying drawings, forming part of this specification.

The improvement consists in the method of giving a quick adjustment of the frame from which the finger-piece is suspended by which the fingers or guards and the knives are given point or elevated above obstructions that would interfere with their direct action. This adjustment becomes necessary in mowing meadows, where strips of moist land occur wherein crawfish-nests abound, and from the gravel therein it is necessary to avoid, as far as possible, cutting into them, and when that cannot be avoided and the top of the nest must be passed through the evil may be abated by the inclined position of the finger-piece, which passes the gravel and clay of the nest quickly off the blades, instead of its remaining thereon until ground up and the edges of the knife or blade ruined. By my improvement I can cut over with ease and safety not only the above, but other obstruction—as clods of earth, stones, &c.—at the will of the driver while the machine is in motion, and also throw the cutters and fingers down and cut good and clear grass close to the earth. This could not be done if the tongue by which the machine is drawn did not admit of an immediate adjustment without stopping the team.

In the drawings, A A is the tongue, passing through or between jaws F, placed on the front portion of the frame B, and extends to the rear framing, B', where it passes through an upright slot under the seat of the driver. The tongue is pivoted at *f* in the jaws F.

E is an upright post rising on A, between the front and rear portions of the frame. It is furnished with holding-pins for retaining the lever D. This lever is also pivoted in the jaws F at *g*.

C is the finger-piece, connected in the usual manner with the frame B B', and carries the fingers and knives in common mode. The lever D has a projection below its line of motion, and by depressing it the front of the frame is elevated, and with it the points of the fingers and cutters or knives, while the rear of the frame descends, and is held in any desired position by the pins in E. While the driver is on his seat his foot may, if necessary, be applied to the rear end of the tongue either in depressing or raising the end thereof.

The second improvement is in applying a roller-cane, G, combined with a shoe, C', and joint-clearer for the purpose of clearing the track in the cut grass. The cone G is armed with diagonally-placed bars *i i*, extending over the rear end of the cone, and are for the purpose of facilitating the motion, and also serves to gather the grass when the length thereof exceeds the pace of the roller.

I is a swing-axis, on which the roller turns.

J is the joint-clearing bar, joined to the axis. It prevents the entrance and winding of the grass at the joint at the apex of the cone.

H is a triangular plate, hinged to the rear of the finger-piece by the side of G. It feeds the cut grass to the roller, which otherwise would not throw it sufficiently out of the way.

C' is the outside guard, by some called the "shoe." It is to this that the track-clearer is attached by a hinge pivoted at *a*.

In noticing the changes of position that the guard, the knives, and the finger-piece assume, it must be borne in mind that the hooked end of the tongue is the point that does not change.

In the drawings the extreme elevation of the point of the guard C' is shown in dotted line. Also, the position of the lever D when locked down on the tongue A A, as well as the change in the frame carrying the finger-piece, is shown in dotted lines; and it will be readily understood how the intermediate changes may be made, as well as the facility given the driver, when seated on K, to quickly raise or depress the rear end of the tongue and effect the desired change in the position of the finger-piece, cutters, &c.

The operation of the cone track-clearer is as follows: When by the movement of the machine the finger-piece is carried forward, the tall cut grass falls on the cone G, which receives a rotary motion by virtue of the angle its axis I bears to the finger-bar, and turns the cut grass outward from the standing grass, the triangular piece H preventing the grass catching on the stubble. In long grass the piece H is not absolutely necessary, as the cone serves all the purposes required.

Having described the nature of my improvements, what I claim as my invention, and desire to secure by Letters Patent, is—

The rolling cone G, moving on the axis I and furnished with a joint-clearer, J, for the purpose of clearing a track in the cut grass.

In testimony whereof I have signed my name before two subscribing witnesses.

ABNER WHITELEY.

Witnesses:
JOHN F. CLARK,
SAML GRUBB.